(12) United States Patent
Grilli et al.

(10) Patent No.: US 8,358,629 B2
(45) Date of Patent: Jan. 22, 2013

(54) MOBILE DEVICE-INITIATED MEASUREMENT GAP REQUEST

(75) Inventors: Francesco Grilli, San Diego, CA (US);
Oronzo Flore, San Diego, CA (US);
Etienne Chaponniere, San Diego, CA (US);
Juan Montojo, San Diego, CA (US);
Masato Kitazoe, Tokyo (JP);
Nathan Tenny, Poway, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1305 days.

(21) Appl. No.: 11/552,514

(22) Filed: Oct. 24, 2006

(65) Prior Publication Data

US 2007/0097914 A1 May 3, 2007

Related U.S. Application Data

(60) Provisional application No. 60/732,691, filed on Nov. 1, 2005.

(51) Int. Cl.
*H04W 4/00* (2009.01)
(52) U.S. Cl. .................... 370/332; 370/331; 455/450
(58) Field of Classification Search .................. 455/450, 455/451, 452.1, 452.2, 552.1, 553.1, 328; 370/328, 331, 332
See application file for complete search history.

(56) References Cited

U.S. PATENT DOCUMENTS

| | | | |
|---|---|---|---|
| 6,449,481 B1 | 9/2002 | Kwon et al. | |
| 6,597,679 B1 | 7/2003 | Willars | |
| 6,694,135 B1 | 2/2004 | Oksala et al. | |
| 6,845,238 B1 | 1/2005 | Muller | |
| 7,197,307 B2 * | 3/2007 | Kirla | 455/436 |
| 7,551,932 B2 * | 6/2009 | Hans et al. | 455/465 |
| 7,564,878 B2 * | 7/2009 | Stadelmeier et al. | 370/329 |
| 7,616,603 B2 * | 11/2009 | Anderson et al. | 370/329 |
| 2008/0014915 A1 * | 1/2008 | Usuda et al. | 455/422.1 |

FOREIGN PATENT DOCUMENTS

| | | |
|---|---|---|
| CN | 1399855 | 2/2003 |
| CN | 1433650 A | 7/2003 |
| EP | 2020823 A1 | 2/2009 |
| KR | 1020020026388 | 4/2002 |
| RU | 2178239 C2 | 1/2002 |
| RU | 2188518 C2 | 8/2002 |

(Continued)

OTHER PUBLICATIONS

Lugara et al., "Performance of UMTS to GSM handover algorithms", Personal, Indoor and Mobile Radio Communications, 2004. PIMRC 2004. 15th IEEE International Symposium on, vol. 1, Sep. 5-8, 2004 pp. 444-448.

(Continued)

*Primary Examiner* — Christian Hannon
(74) *Attorney, Agent, or Firm* — Francois A. Pelaez

(57) ABSTRACT

Described herein are mechanisms and methods that facilitate preparation of inter-radio access technology (inter-RAT) and/or inter-frequency handover with respect to a mobile device (user equipment). User equipment can indicate to a network servicing the user equipment that the user equipment desires to perform measurements with respect to a different frequency and/or different technology. Data on the downlink channel can then be scheduled to ensure that data intended for the user equipment is not lost while the user equipment is performing the measurements.

22 Claims, 14 Drawing Sheets

FOREIGN PATENT DOCUMENTS

WO            WO0013430 A2     3/2000

OTHER PUBLICATIONS

Lugara et al., "UMTS GSM handover based on compressed mode technique", Communications, 2004 IEEE International Conference on, vol. 5, Jun. 20-24, 2004 pp. 3051-3055.

Wang et al., "Comparison between the periodic and event-triggered compressed mode", Vehicular Technology Conference, 2002. VTC Spring 2002. IEEE 55th, vol. 3, May 6-9, 2002 pp. 1331-1335.

"Universal Mobile Telecommunications System (UMTS)", ETSI Standards, European, Telecommunications Standard Institute, Sophia-Antipo, France, vol. 3-RI, No. V640, Sep. 2005, pp. 1-19.

International Search Report and Written Opinion—PCT/US2006/060454, International Search Authority—European Patent Office—Apr. 5, 2007.

Taiwan Search Report—TW095140462—TIPO—Mar. 11, 2011.

NTT DoCoMo et al: "Measurements for LTE Intra and Inter-RAT Mobility", 3GPP Draft; R2-060086, 3rd Generation Partnership Project (3GPP), Mobile Competence Centre; 650, Route Des Lucioles; F-06921 Sophia-Antipolis Cedex; France, vol. RAN WG2, No. Sophia Antipolis, France; Jan. 5, 2006, XP050130243, [retrieved on Jan. 5, 2006].

QUALCOMM Europe: "Measurement gap scheduling", 3GPP Draft; R2-060058, 3rd Generation Partnership Project (3GPP), Mobile Competence Centre; 650, Route Des Lucioles; F-06921 Sophia-Antipolis Cedex; France, vol. RAN WG2, No. Sophia Antipolis, France; Jan. 5, 2006, XP050130222, [retrieved on Jan. 5, 2006].

QUALCOMM Europe: "Measurement Gap Scheduling", 3GPP Draft; R2-062359, 3rd Generation Partnership Project (3GPP), Mobile Competence Centre; 650, Route Des Lucioles; F-06921 Sophia-Antipolis Cedex; France, vol. RAN WG2, No. Tallinn; Aug. 23, 2006, XP050131951, [retrieved on Aug. 23, 2006].

QUALCOMM Europe: "Qualcomm proposal for E-UTRAN Architecture and Protocols" 3GPP Draft; R2-052921, SRD Generation Partnership Project (3GPP), Mobile Competence Centre; 650, Route Des Lucioles; F-06921 Sophia-Antipolis Cedex; France, vol. 1, No. Seoul, Korea; 20051107, Nov. 1, 2005, XP050130142.

\* cited by examiner

MOBILE DEVICE-INITIATED MEASUREMENT GAP REQUEST

CROSS-REFERENCE TO RELATED APPLICATION

This application claims the benefit of U.S. Provisional Patent application Ser. No. 60/732,691 entitled "MEASUREMENT OCCASIONS FOR INTER-RAT HANDOVER FROM E-UTRAN" which was filed Nov. 1, 2005. The entirety of the aforementioned application is herein incorporated by reference.

BACKGROUND

I. Field

The following description relates generally to wireless communications, and, amongst other things, to flexible communication schemes for wireless communications systems.

II. Background

In many scenarios, to enable effective exchange of data between user equipment (UE) and base stations (a network) that service the UE, transmission of data must be precisely scheduled. Conventionally, base stations or other network entities create a schedule to enable UE to receive, for instance, data over a high-speed data link. Additionally, as UE is mobile, the base station (or other network entity) includes within the schedule periods of time that transmission of data will temporarily cease, thereby enabling the UE to determine if another base station, another frequency, and/or another technology will provide better network services when compared to services provided by a base station that is currently servicing the UE.

In a detailed example, in systems such as the Global System for Mobile Communications (GSM), the UE transmits and receives at different times and there exists idle time during which the UE can measure parameters associated with other frequencies, technologies, and/or base stations to determine if a handover is desirable. In Code Division Multiple Access (CDMA) and Orthogonal Frequency Division Multiple Access (OFDMA) systems, however, data is constantly being transmitted between UE and a base station, such that no guaranteed idle time exists that the UE can measure performance parameters with respect to other frequencies and/or technologies. In these types of scheduled systems, because downlink data is scheduled dynamically by a network entity, the UE has little advance notice of when packets addressed to it will arrive. Any data that arrives while the UE is taking measurements with respect to other frequencies and/or technologies will be lost.

SUMMARY

The following presents a simplified summary in order to provide a basic understanding of some aspects of the disclosed subject matter. This summary is not an extensive overview, and is not intended to identify key/critical elements or to delineate the scope of such subject matter. Its sole purpose is to present some concepts in a simplified form as a prelude to the more detailed description that is presented later.

Briefly described, the disclosed subject matter generally pertains to a request for a measurement gap that is initiated from a mobile device (e.g., user equipment). User equipment can determine that quality associated with a downlink channel has sufficiently degraded such that it is desirable to determine whether other systems (technologies) or frequencies may provide better service that a system or frequency currently associated with the user equipment. For instance, the user equipment can determine a quality metric associated with the downlink channel and can further determine that the quality metric is below a pre-defined threshold. Thereafter, the user equipment can request a measurement gap from a network currently providing services to the user equipment, such that the user equipment can stop listening to the downlink channel and perform measurements with respect to other systems/frequencies without fear of data loss. In an example, the user equipment can inform a base station that a measurement gap is desired by setting a particular value within a channel quality indicator report or within a MAC-e (or other layer-2) header. The network can, upon receipt of an indication that a measurement gap is desired, schedule a measurement gap; accordingly, data is not scheduled for transmission on the downlink channel during the measurement gap. In an example, the user equipment can refrain from performing measurements until explicitly authorized by the network (e.g., the network can provide the user equipment with a schedule that includes a measurement gap).

In connection with the above, a method in accordance with an aspect described herein comprises determining that it is desirable to undertake measurements with respect to one or more of a different frequency and a different technology when compared to one or more of a current frequency and technology associated with a network that is servicing user equipment. The method further comprises indicating to the network servicing the user equipment the desirability of undertaking the measurements. Additionally, a communications apparatus can comprise a memory that includes instructions for indicating to a network that performing one or more of inter-frequency and inter-radio access technology measurements is desired. The apparatus can also include a processor that is configured to execute the instructions within the memory.

Furthermore, in another aspect, a communications apparatus can comprise means for determining that a measurement gap is desired and means for indicating to a network servicing the communications apparatus that the measurement gap is desired. Additionally, a computer-readable medium can have computer-executive instructions stored thereon for determining that a measurement gap is desired and indicating to a base station that the measurement gap is desired. In yet another aspect, a processor is described herein, wherein the processor can be configured to execute instructions for indicating to a network that a measurement gap is desired as well as performing measurements upon a downlink buffer associated with the processor being flushed.

Still further, a method is disclosed herein, wherein the method comprises receiving a request for a measurement gap from user equipment, and scheduling downlink data to the user equipment based at least in part upon the received request. Additionally, a communications apparatus is described herein, wherein the apparatus comprises a memory that retains instructions for scheduling data to be delivered on a downlink to user equipment based at least in part upon a request for a measurement gap provided by the user equipment. The apparatus also comprises a processor that is configured to execute the instructions. Moreover, a communications apparatus can comprise means for receiving an indication that a measurement gap is desired from user equipment and means for scheduling downlink transmissions to the user equipment based at least in part upon the received indication.

In still another aspect, a computer-readable medium can have stored thereon computer-executable instructions for receiving a channel quality indicator report from user equipment and analyzing the channel quality indicator report. The computer-executable institutions can further include determining that quality of a downlink channel associated with user equipment is below a pre-defined threshold based at least in part upon the analysis of the channel quality indicator report, and scheduling a measurement gap for the user equipment. In addition, a processor can be configured to execute instructions for determining that a request for a measurement gap has been received from user equipment and scheduling data on a downlink channel to the user equipment as a function of the request.

To the accomplishment of the foregoing and related ends, certain illustrative aspects are described herein in connection with the following description and the annexed drawings. These aspects are indicative, however, of but a few of the various ways in which the principles of the disclosed subject matter may be employed and the claimed matter is intended to include all such aspects and their equivalents. Other advantages and novel features may become apparent from the following detailed description when considered in conjunction with the drawings.

BRIEF DESCRIPTION OF THE DRAWINGS

FIG. 11 is an example system that facilitates scheduling of transmission of data on a downlink channel as a function of a request for a measurement gap.

DETAILED DESCRIPTION

Figure 1:
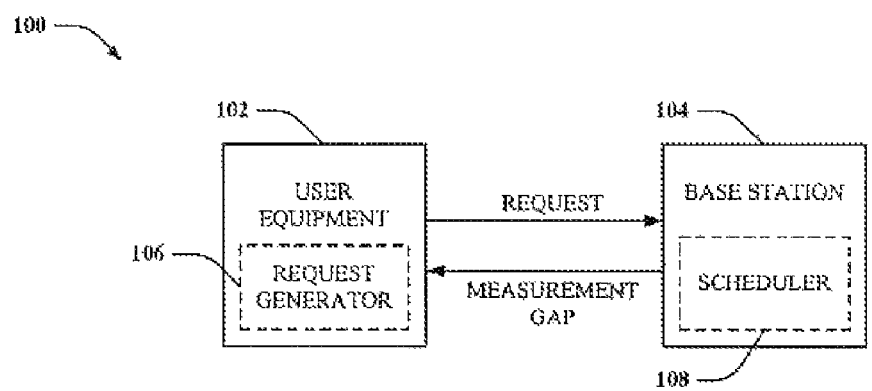
FIG. 1 is an example high-level block diagram of a system that facilitates request for and provision of a measurement gap.

The claimed subject matter is now described with reference to the drawings, wherein like reference numerals are used to refer to like elements throughout. In the following description for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing the subject invention.

Furthermore, various embodiments are described herein in connection with user equipment (UE). UE can also be called a system, a subscriber unit, subscriber station, mobile station, mobile device, remote station, remote terminal, access terminal, user terminal, terminal, user agent, or user device. UE can be a cellular telephone, a cordless telephones, a Session Initiation Protocol (SIP) phone, a wireless local loop (WLL) station, a PDA, a handheld device having wireless connection capability, a processor within a mobile device, or other processing device connected to a wireless modem.

Moreover, aspects of the disclosed subject matter may be implemented as a method, apparatus, or article of manufacture using standard programming and/or engineering techniques to produce software, firmware, hardware, or any combination thereof to control a computer to implement various aspects of the claimed subject matter. The term "article of manufacture" as used herein is intended to encompass a computer program, accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . , smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

Turning now to the drawings, FIG. 1 illustrates a system 100 that facilitates scheduling measurement gaps based at least in part upon information provided from user equipment. The system 100 includes user equipment 102 that is communicatively coupled to a base station 104 in a wireless manner. In other words, base Station 104 is providing voice and/or data services to user equipment 102 over a downlink and receiving communications from user equipment 102 over an uplink. In an example, base station 104 provides a schedule to user equipment 102 regarding when downlink transmissions are to occur, and can further schedule "measurement gaps" that enable user equipment 102 to determine quality of a signal associated with another frequency and/or technology. More particularly, user equipment 102 can be mobile in nature, such that quality associated with signals received from base station 104 can vary as user equipment 102 translates to a different geographic region. Conventionally, scheduling of measurement gaps is performed in a rigid manner, such that every threshold amount of time base station 104 schedules a measurement gap for user equipment 102. Such rigid scheduling does not optimize use of resources associated with base station 104.

Accordingly, user equipment 102 can include a request generator 106 that creates a request for a measurement gap and provides such request to base station 104 over the uplink. In an example, such request can be provided over the data link layer (layer 2 signaling). The request can be in the form of a flag that is within a channel quality indicator (CQI) report, a flag or value within the header of a data packet (such as within a MAC-e header), or any other suitable manner for providing a request to base station 104. In an aspect, the request created by request generator 106 can be an indication that user equipment 102 is going to perform a measurement, and a scheduler 108 associated with base station 104 can schedule downlink transmissions accordingly. Therefore, a network associated with base station 104 is passive with regards to scheduling measurement gaps.

In another aspect, base station 104 can provide an indication of receipt of the request created by request generator 106 to user equipment 102. For instance, request generator 106 can create a CQI report and can indicate within the report that user equipment 102 desires to tune-away from base station 104. User equipment 102 can then transmit the CQI report to base station 104. Base station 104 receives the CQI report, analyzes contents of the report, and transmits an indication of receipt of the report to user equipment 102 over the downlink. Upon receiving the acknowledgement of receipt from base stations 104, user equipment 102 can tune away from the downlink channel to perform measurements with respect to other frequencies and/or other technologies. Upon returning to the downlink channel, user equipment 102 can send an indication of such to base station 104, and base station 104 can proceed with providing voice/data to user equipment 102 by way of the downlink channel.

In yet another aspect, a network associated with base station 104 can have more control over when user equipment 102 performs measurements with respect to different technologies and/or different frequencies. For instance the network can determine a quality threshold and can communicate such quality threshold to user equipment 102, wherein such communication can occur by way of a broadcast channel and/or a dedicated downlink channel (e.g., by way of layer 2 or layer 3 signaling. When the user equipment determines that quality metric of a downlink signal between user equipment 102 and base station 104 is below the threshold, request generator 106 can indicate as much to base station 104 (e.g., by transmitting a CQI report to the base station and indicating therein that the quality metric is below the threshold). Base station 104 can treat receipt of the CQI report as a request by user equipment 102 to perform measurements with respect to different frequencies and/or different technologies. Scheduler 108 associated with base station 104 can create a schedule based at least in part upon contents of the CQI report, and base station 104 can provide the schedule to user equipment 102. Accordingly user equipment 102 will have knowledge of when it can stop monitoring the downlink channel between base station 104 and user equipment 102 and perform measurements with respect to other frequencies/technologies. Thus the network associated with base station 104 can have more control over scheduling.

Scheduler 108 can take into account various other factors when generating a schedule for user equipment 102. Pursuant to an example, scheduler 108 can consider how recently (and with how much frequency) user equipment 102 has requested to perform measurements with respect to one or more different frequencies and/or technologies, For instance, if user equipment 102 has very recently performed measurements, then scheduler 108 can cause user equipment 102 to wait a particular period of time prior to allowing user equipment 102 to stop listening to the downlink channel to perform measurements relating to other frequencies/technologies. Thus, a schedule created by scheduler 108 can include a measurement gap that does not occur immediately. In another example, scheduler 108 can consider whether there is a queue of data for transmission to user equipment 102, and can schedule a measurement gap based upon such consideration. Still further, scheduler 108 can consider schedules associated with other user equipment, such that measurement gaps are scheduled for user equipment in an attempt to optimize network resources. In addition, when the user equipment has completed measurements, it can send an indication to the network that the measurements have been performed and that the user equipment is ready for further data communication.

Figure 2:
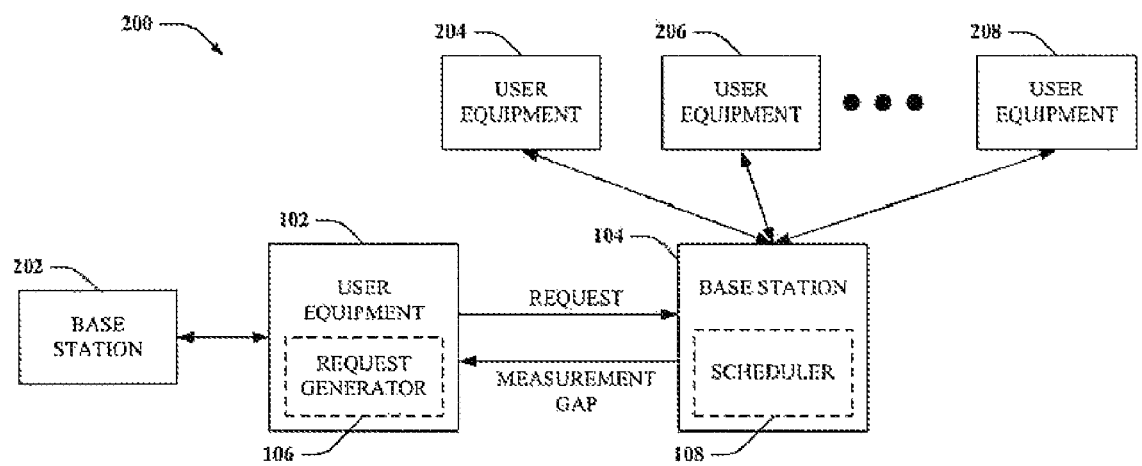
FIG. 2 is an example block diagram of a system that facilitates optimizing when a measurement gap is scheduled.

Referring now to FIG. 2, a system 200 that facilitates scheduling of measurement gaps based at least in part upon a request for a measurement gap provided by user equipment is illustrated. The system 200 includes user equipment 102 that is wirelessly coupled to base station 104. As described above, base station 104 can include scheduler 108 which provides user equipment 102 with a schedule for a particular period of time, wherein the schedule indicates when (and for how long) user equipment 102 can refrain from listening to a downlink channel and can perform measurements with respect to another base station 202. In an example, user equipment 102 can be transported near a coverage boundary associated with base station 104. User equipment 102 can perform an analysis of signal quality and can request a measurement gap from base station 102. For instance, the request can be within a MAC-e header, within a CQI report, or any other suitable manner for providing the request from user equipment 102 to base station 104. Additionally, the request can be in the form of a flag set within a particular quality report or within a header of a data packet. Moreover, while user equipment 102 can perform measurements with respect to base station 202 after base station 104 schedules a measurement gap for user equipment 102, it is understood that user equipment 102 can request a measurement gap to perform measurements with respect to different frequencies/technologies provided by base station 104.

Base station 104 can also be providing data/voice service (s) to various other user equipment 204-208, which can include portable telephones, personal digital assistants, and/or the like. Thus, network resources are allocated amongst several devices, and each of the devices can request measurement gaps from base station 104. Scheduler 108 within base station 104 can receive multiple requests for measurement gaps from user equipment 102 and 204-208, and can optimize scheduling of such measurement gaps with respect to network resources. In other words, all of the user equipment 102 and 204-208 will not be provided with measurement gaps at a substantially similar time.

Figure 3:
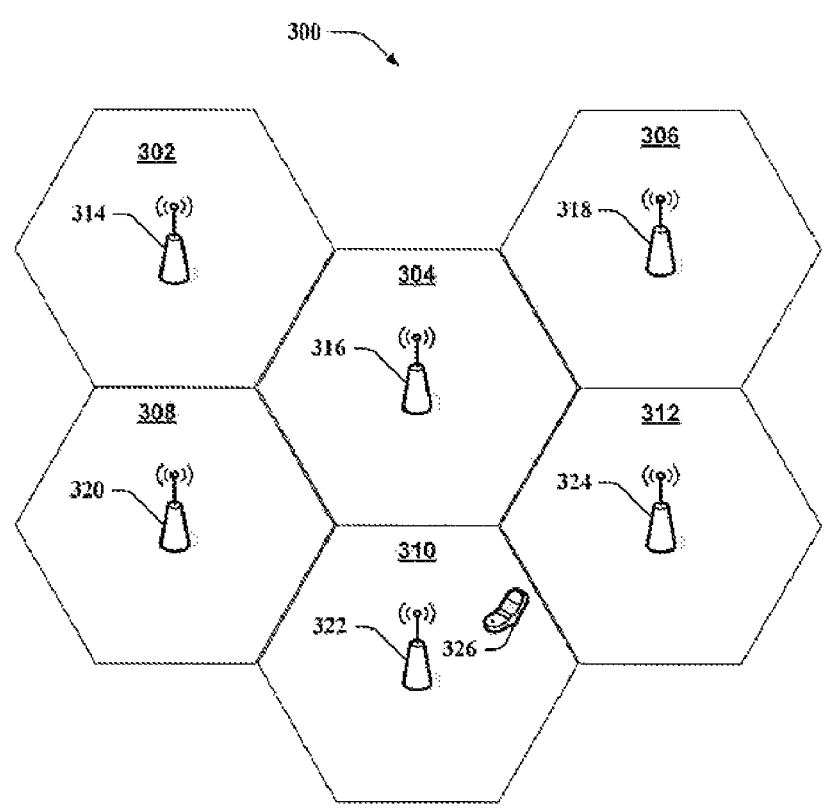
FIG. 3 is an example wireless communications environment.

Now turning to FIG. 3, an example wireless communications system 300 is provided, wherein benefits providing measurement gaps can be perceived. The system 300 includes a plurality of sectors 302-312, wherein user equipment can employ wireless services within such sectors 302-312. While the sectors 302-312 are shown as being hexagonal in nature and of substantially similar size, it is understood that size and shape of sectors 302-312 can vary depending upon geographical region, number, size, and shape of physical impediments, such as buildings, and several other factors. Access points 314-324 are associated with sectors 302-312, wherein access points 314-324 are utilized to provide services to user equipment within sectors 302-312. Access points 314-324 may transmit data in various frequency bands, such that user equipment 326 cannot necessarily receive data from one access point while measuring the signal strength from another access point. Each of the access points 314-324 can provide service to multiple pieces of user equipment. In the system 300, user equipment 326 is associated with sector 310 and thus can be serviced by access point 322. User equipment 326, however, may be portable and can therefor move to disparate sectors (e.g., out of range for suitable communications from access point 322). It is thus desirable to allow user equipment to request and receive measurement gaps from an access point servicing the user equipment.

In a particular example, user equipment 326 can be serviced by access point 322 (which is associated with sector 310). As user equipment 326 transitions close to a boundary of sector 310, downlink signal quality associated with access point 322 and user equipment 326 can deteriorate. When user equipment 326 determines that signal quality has gone below a threshold, for instance, user equipment 326 can request a measurement gap from access point 322. Access point 322 can receive such request and generate a schedule and provide the schedule to user equipment 326, wherein the schedule indicates when the measurement gap will occur as well as length of the measurement gap. During the scheduled measurement gap, user equipment 326 can stop listening to the downlink channel associated with access point 322 and can perform measurements with respect to, for instance, access point 324. If the quality of signal is sufficiently high, access point 324 can be considered a candidate for handover. While the above example indicates that user equipment 326 generates a request and awaits receipt of such request and provision of a schedule from access point 322, it is understood that various other protocols are contemplated. For instance, rather than requesting a measurement gap from access point 322, user equipment 326 can provide an indication to access point 322 that user equipment 326 is going to be obtaining measurements with respect to another access point (e.g., access point 324). Access point 322 can then cache data desirably provided to user equipment 326, either to be transmitted to user equipment 326 after it resumes receiving data from access point 322, or for forwarding to another access point for transmittal to user equipment 326 after handover. Various other protocols are described herein.

Figure 4:
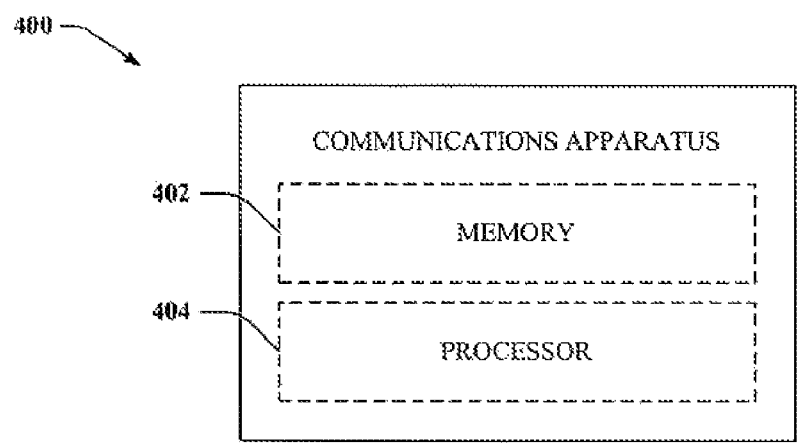
FIG. 4 is an example apparatus that facilitates request of a measurement gap and/or provision of a schedule that includes a measurement gap.

Now referring to FIG. 4, a communications apparatus 400 for employment within a wireless communications environment is illustrated. The apparatus 400 can be a base station or a portion thereof or user equipment or a portion thereof (such as a secure digital (SD) card coupled to a processor). Apparatus 400 can include a memory 402 that retains various instructions with respect to signal processing, scheduling communications, requesting measurement gaps, and/or the like. For instance, if apparatus 400 is user equipment, memory 402 can include instructions for analyzing quality of signals on an uplink and/or downlink channel with respect to a particular base station. Thus, for example, memory 402 can include instructions for periodically generating CQI reports. Memory 402 can additionally include instructions for transmitting a request for a measurement gap to a base station servicing user equipment associated with apparatus 400. For example, memory 402 can include instructions for setting a flag within a CQI report to indicate that a measurement gap is desired. Moreover, memory 402 can comprise instructions for indicating within a MAC-e header that a measurement gap is desired by user equipment that comprises the apparatus 400. Still further, memory 402 can retain instructions for receiving a schedule, analyzing the schedule, and performing measurements with respect to one or more base stations as a function of contents of the schedule. Pursuant to an example, memory 402 can include instructions for performing measurements with respect to a particular base station within a certain window of time. Further, memory 402 can comprise instructions for causing user equipment to perform measurements upon notifying a base station that services apparatus 400 measurements are to be undertaken. The above example instructions and other suitable instructions can be retained within memory 402, and a processor 404 can be utilized in connection with executing the instructions (depending upon, for instance, contents of a schedule, signal quality, etc.)

Also, as stated above, apparatus 400 can be a base station and/or a portion thereof. In such case, memory 402 can include instructions for receiving an indication that user equipment serviced by apparatus 400 is taking measurements with respect to other technologies and/or frequencies. Memory 402 can additionally include instructions for halting transmission of voice/data over a downlink channel associated with the user equipment until the user equipment indicates that it has completed performing measurements with respect to the other technologies and/or frequencies. In another example, memory 402 can include instructions for receiving a request for measurement gaps as well as instructions for generating a schedule based at least in part upon the request. Memory 402 can further include instructions for transmitting the schedule to the user equipment that initiated the request, wherein the schedule includes timing information relating to when the user equipment is to undertake measurements and length of time the user equipment is to undertake measurements. Still further, memory 402 can include instructions for contemplating status of other user equipment serviced by apparatus 400 to optimize network resources, as well as instructions for considering one or more CQI reports previously provided by the user equipment. Processor 404 can be employed to execute instructions retained within memory 402. While several examples have been provided, it is understood that instructions described in the form of methodologies (e.g., FIGS. 5-9) can be included within memory 402 and executed by processor 404.

Referring to FIGS. 5-9, methodologies relating to requesting and providing measurement gaps are illustrated. While, for purposes of simplicity of explanation, the methodologies are shown and described as a series of acts, it is to be understood and appreciated that the methodologies are not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with one or more embodiments.

Figure 5:
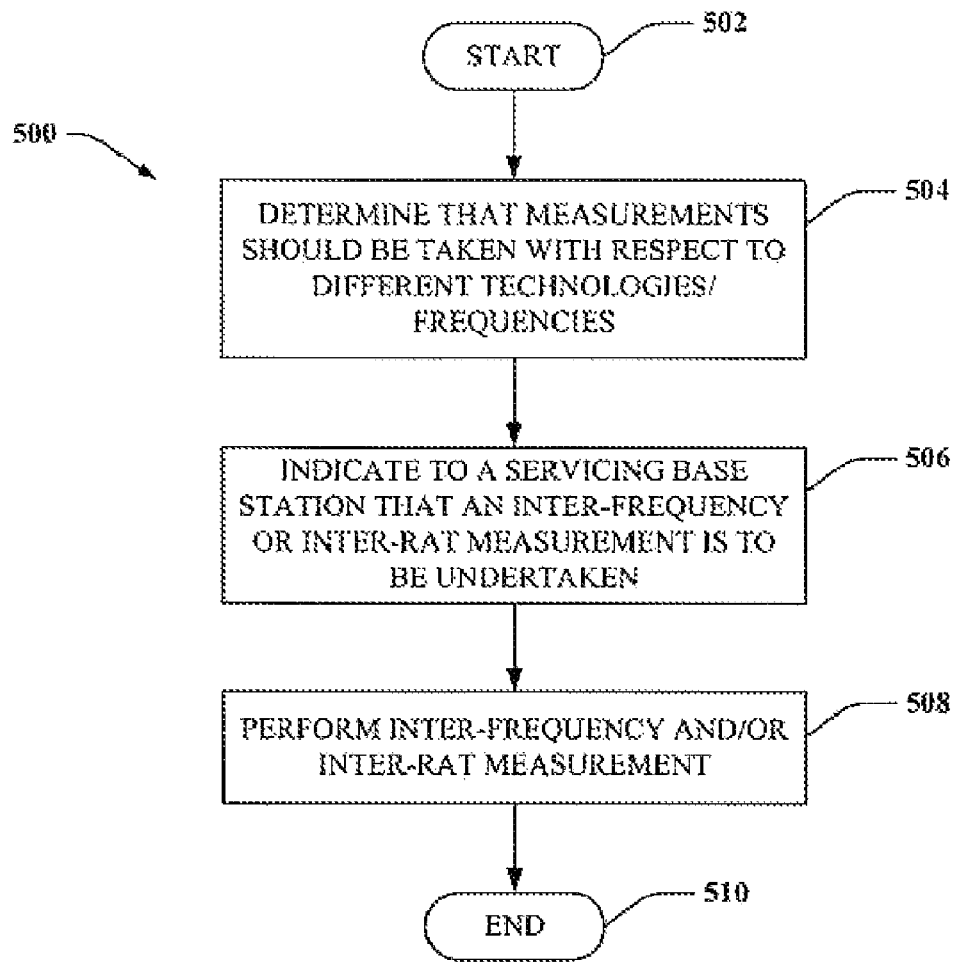
FIG. 5 is a representative flow diagram illustrating an example methodology for performing inter-frequency and/or inter-RAT (inter-Radio Access Technology) measurements based at least in part upon a request for a measurement gap.

Referring solely to FIG. 5, a method 500 for performing an inter-frequency and/or inter-RAT (inter-Radio Access Technology) measurement is illustrated. For instance, a portion of user equipment can be configured to perform the method 500. The method 500 starts at 502, and at 504 a determination is made that measurements should be taken with respect to different technologies and/or frequencies. For instance, user equipment can be receiving a downlink data service with dynamically scheduled transmissions (e.g., High Speed Downlink Packet Access (HSDPA)) from a base station associated with a particular type of network. For instance, the network can be an E-UTRAN network, which is a proposal associated with 3GPP with respect to evolution of third generation Wideband CDMA (WCDMA) to a Long Term Evolution (LTE) system. The user equipment can periodically measure signal strength, quality (such as signal to noise ratio), and/or other metrics to determine a quality of a downlink channel. If the quality of the downlink channel is sufficiently low, then it can be determined by the user equipment that measurements are to be taken with respect to other frequencies and/or technologies (such as with respect to a GSM system).

At 506, an indication is provided to a base station servicing the user equipment that an inter-frequency or inter-RAT measurement is to be undertaken by the user equipment. For example, the user equipment can provide the indication within an uplink transmission on the physical channel. In a more specific example, the user equipment can provide the base station with a CQI report that includes a value that is to be interpreted by the receiving base station to mean that the user equipment is taking measurements with respect to different technologies and/or frequencies. Alternatively, the indication can be placed within a MAC-e header, for instance. Upon receipt of such indication, the base station (or system associated therewith) can silently refrain from scheduling downlink data for the user equipment during a duration of a measurement gap, wherein such duration can be predefined and/or defined within the indication provide at 506. As used herein, "measurement gap" refers to an amount of time available for user equipment to perform measurements without listening to a downlink channel with assurance that a servicing system will not schedule any downlink data for the user equipment during such time.

At 508, inter-frequency and/or inter-RAT measurements can be performed by the user equipment, wherein time associated with performance of the measurements can be defined within the indication at 506 and/or can be indefinite (e.g., until the user equipment returns to the downlink channel and indicates such return). If, for instance, a base station that is associated with the measurements is associated with a sufficiently strong signal, then such base station can be considered a candidate for a handover. The methodology 500 then completes at 510.

Figure 6:
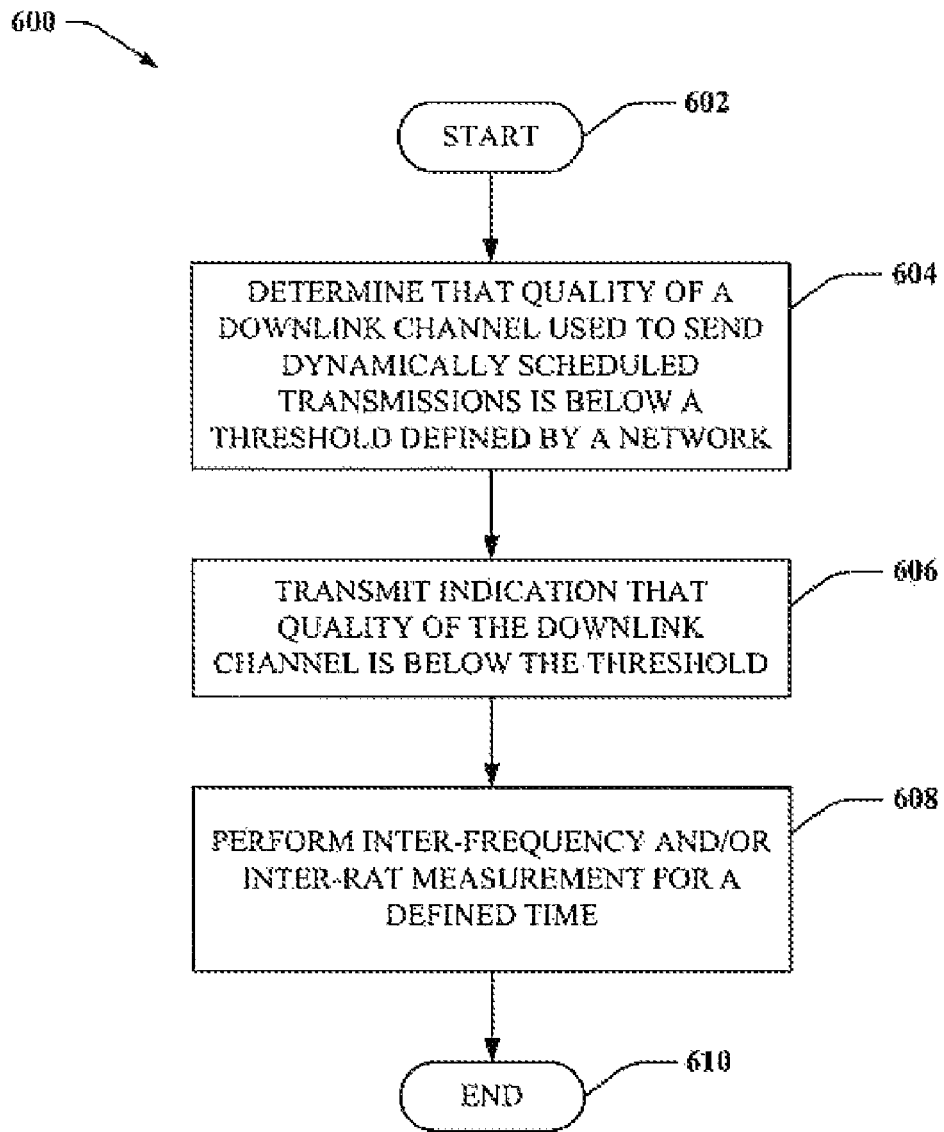
FIG. 6 is a representative flow diagram illustrating an example methodology for performing inter-frequency and/or inter-RAT measurements based at least in part upon a request for a measurement gap.

Now turning to FIG. 6, a methodology 600 for performing inter-frequency and/or inter-RAT measurements is illustrated. The methodology 600 begins at 602, and at 604 a determination that a quality of a downlink channel is below a threshold defined by a network that provides services to a particular piece of user equipment, wherein the downlink channel is utilized to provide the user equipment with dynamically scheduled transmissions. Since transmissions are dynamic in nature, a protocol by which the user equipment and servicing network can utilize to determine when to schedule measurement gaps such that data packets are not lost (e.g., delivered to the user equipment while the user equipment is not listening to the downlink channel). Pursuant to an example, the threshold can be unique with respect to the user equipment, such that the threshold is provided to the user equipment by way of layer two or layer three dedicated signaling. In another example, the threshold can be broadcast throughout a system (e.g., by way of layer three signaling). In either case, the network can determine the threshold, thereby providing greater involvement from the network side when compared to the methodology 500 (FIG. 5).

At 606, an indication that the quality of the downlink channel is below the threshold is transmitted to a base station providing services to the user equipment. The indication can be provided within a CQI report and/or a MAC-e header that is generated by the user equipment and transmitted to the base station over an uplink channel. This indication can signal to the network that data packets should not be provided to the user equipment for a particular amount of time. At 608, inter-frequency and/or inter-RAT measurements are performed by the user equipment for a defined period of time, wherein the time can be pre-defined by the user equipment or the network or defined within the indication. The methodology 600 then completes at 610.

Figure 7:
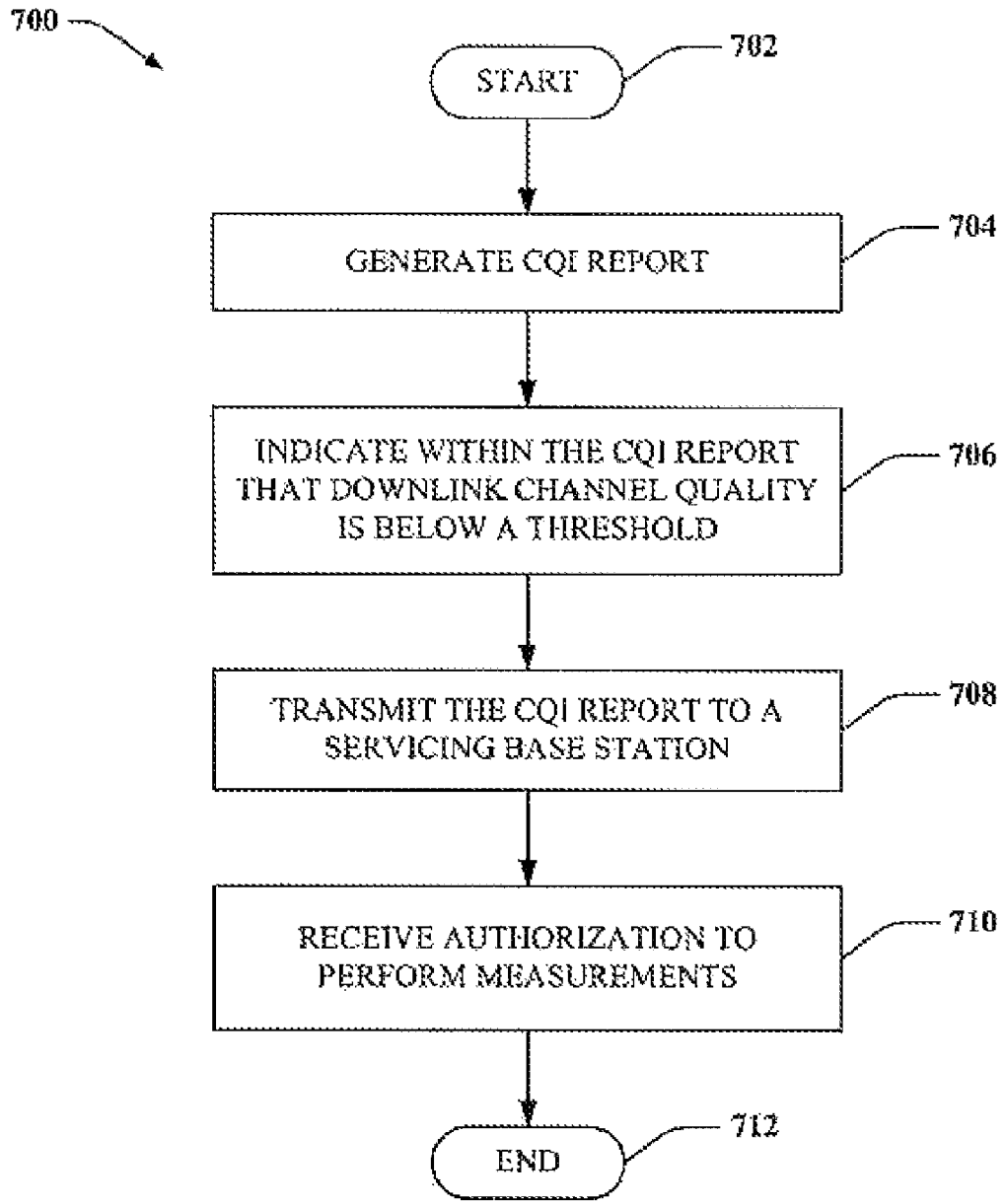
FIG. 7 is a representative flow diagram illustrating an example methodology for indicating within a channel quality indicator report that a measurement gap is desired.

With reference now to FIG. 7, a methodology 700 for performing inter-frequency and/or inter-RAT measurements is illustrated. The methodology 700 starts at 702, and at 704 a CQI report is generated. For instance, CQI reports can be generated periodically to indicate channel conditions as perceived by user equipment to a base station/network providing services to the user equipment. At 706, an indication is provided within the CQI report that downlink channel quality is below a threshold, wherein the threshold can be defined by a network and provided to the user equipment. For instance, a CQI value within the CQI report can indicate to a network that downlink channel quality is below a threshold and can further indicate that the user equipment providing the CQI report desires to perform measurements with respect to other frequencies and/or systems. In an example, user equipment can be receiving a downlink data service with dynamically scheduled transmissions (e.g., HSDPA) from an E-UTRAN, and the user equipment may desirably undertake measurements on neighboring systems to determine whether to perform an inter-RAT handover. Typically the user equipment would be near the edge of an E-UTRAN coverage "island", where quality of E-UTRAN coverage declines and the user equipment considers whether to more to a W-CDMA, GSM, or other suitable system.

At 708, the CQI report is transmitted to a base station that is providing service to the user equipment. The CQI can be analyzed on the network side to discern that the user equipment desires to perform measurements with respect to other systems and/or frequencies. The network can then generate a schedule, wherein the schedule can include when the user equipment can stop listening to the downlink channel to perform measurements and a duration of time that measurements can be performed with respect to other systems/frequencies. Thus, data will not be scheduled on the downlink channel during a time that the user equipment is performing measurements with respect to other frequencies and/or other technologies. At 710, authorization is received at the user equipment regarding performing measurements with respect to different frequencies and/or technologies. Such authorization can be in the form of a schedule transmitted to the user equipment. If the schedule is not received within a particular period of time from transmittal of the CQI report, such report can be re-transmitted to the network. The methodology 700 completes at 712.

Figure 8:
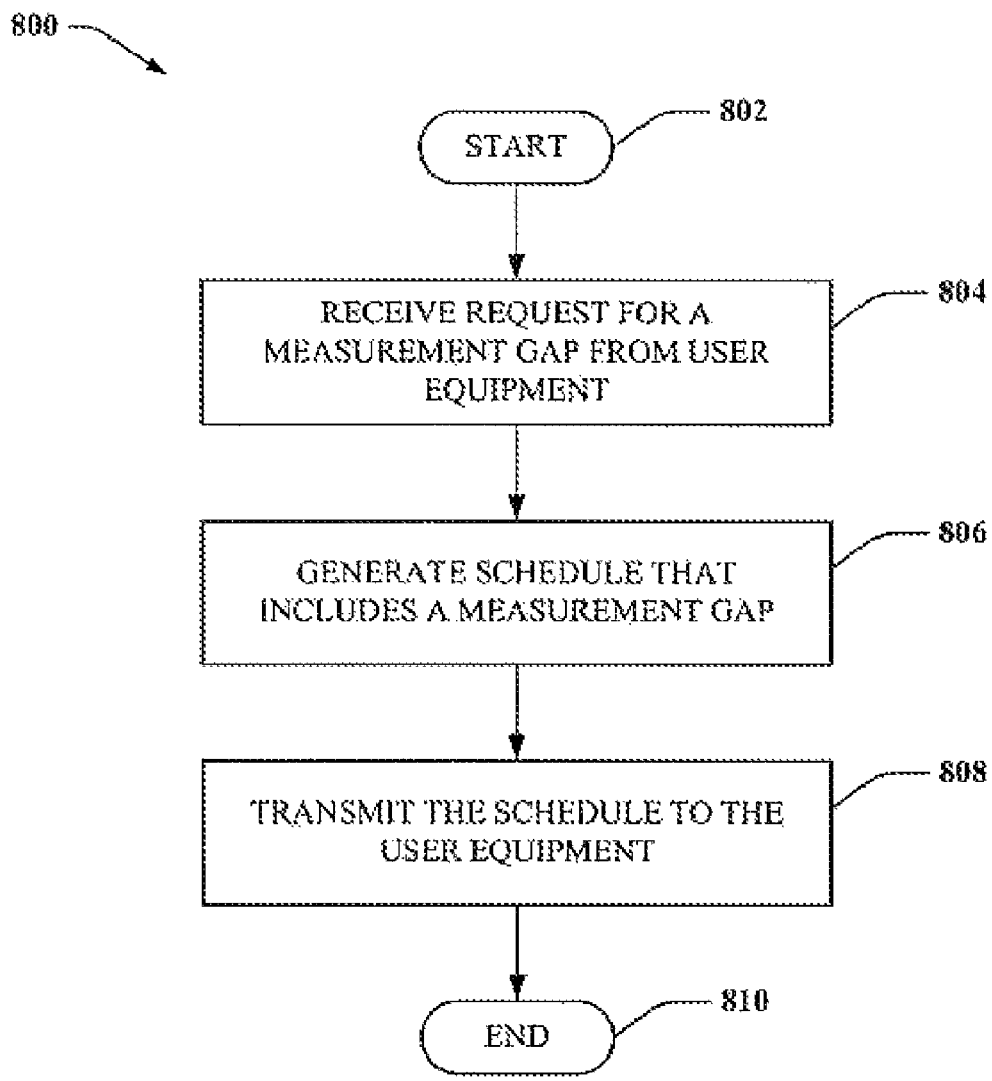
FIG. 8 is a representative flow diagram illustrating an example methodology for transmitting a schedule that includes a measurement gap to user equipment.

Turning now to FIG. 8, a methodology 800 for providing user equipment with a schedule, wherein the schedule includes a measurement gap is illustrated. The methodology 800 starts at 802, and at 804 a request for a measurement gap is received from user equipment. For instance, the request can be a unique message, placed within a CQI report, placed within a MAC-e header, or other suitable request. At 806, a schedule is generated that includes a measurement gap, wherein the schedule includes a time period that the user equipment can perform measurements with respect to other systems/frequencies. The schedule enables a network providing services to the base station to not schedule data on a downlink channel during the measurement gap. At 808, the schedule is transmitted to the user equipment, which can then perform measurements with respect to other systems/frequencies during the measurement gap. The methodology 800 then completes at 810.

Figure 9:
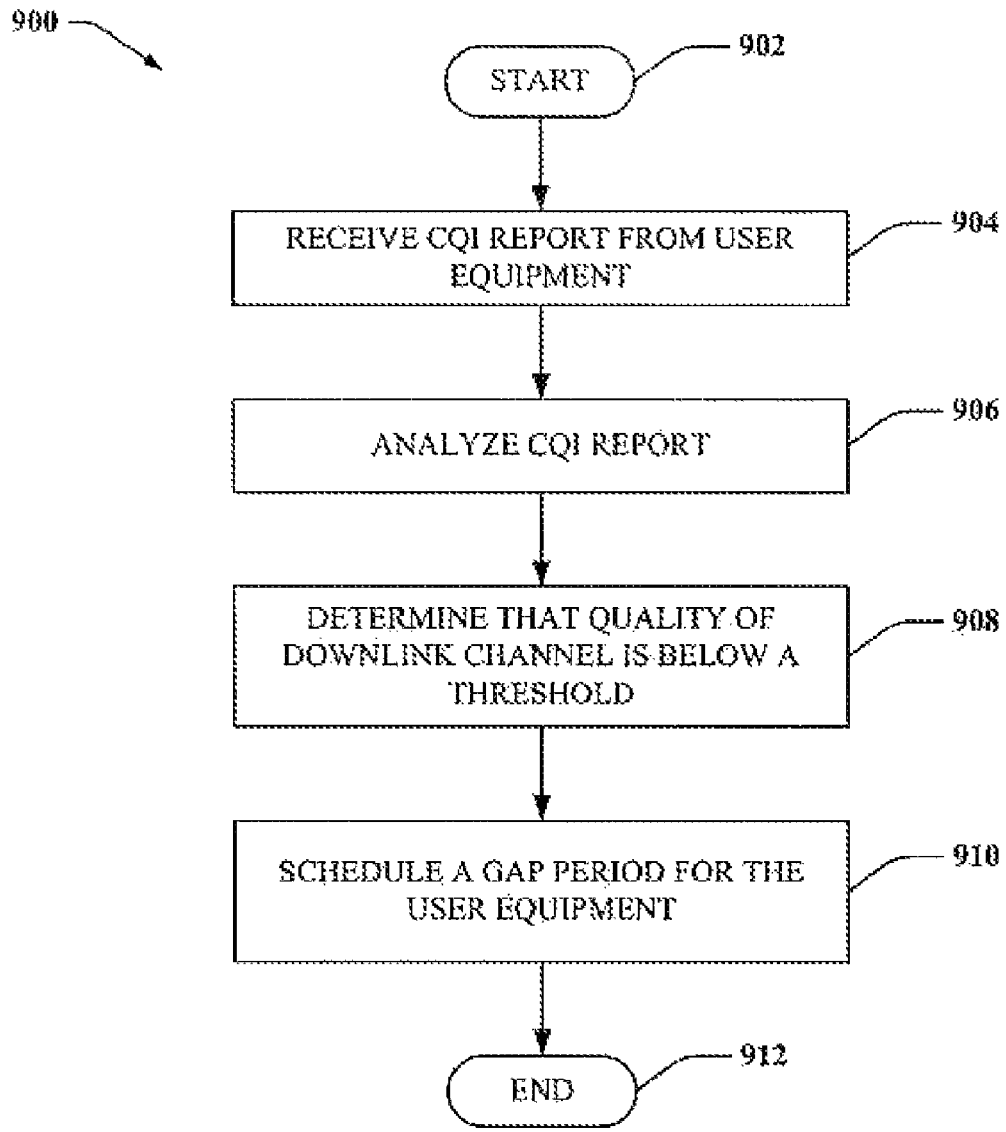
FIG. 9 is a representative flow diagram illustrating an example methodology for utilizing a CQI report to carry a gap request

Now referring to FIG. 9, a methodology 900 for scheduling measurement gaps is illustrated. The methodology 900 starts at 902, and at 904 a CQI report is received from user equipment. At 906, the CQI report is analyzed, and at 908 it is determined that the reported downlink channel quality with respect to user equipment that transmitted the CQI report is below a threshold. At 910, a measurement gap is scheduled with respect to the user equipment and transmitted to the user equipment. The user equipment can thereafter stop listening to the downlink channel to perform measurements with respect to other systems/frequencies. The methodology 900 then completes at 912.

Figure 10:
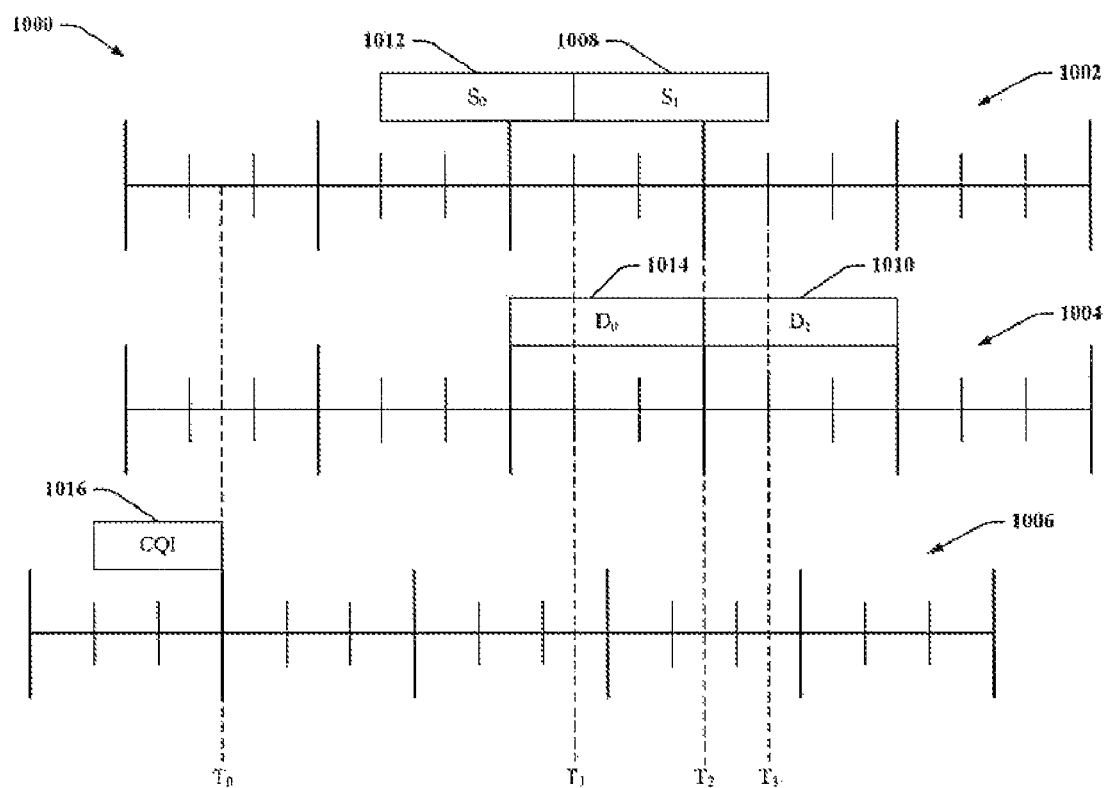
FIG. 10 is an example timing diagram

With reference now to FIG. 10, an example timing diagram 1000 is illustrated. The timing diagram 1000 depicts a time alignment of scheduling and user data on the downlink and CQI reporting on the uplink when HSDPA is utilized (radio propagation time is assumed to be negligible). As described above, however, aspects described herein are applicable to various technologies and are not limited to HSDPA. In the example illustrated, time between large hash marks can represent 2 millisecond Transmission Time Interval (TTI) boundaries and time between small hash marks can represent slots.

A first portion 1002 of the example timing diagram 1000 can represent scheduling information provided by way of a High Speed Shared Control Channel (HS-SCCH), a second portion 1004 of the timing diagram 1000 can represent user data on a High Speed Downlink Shared Channel (HS-DSCH), and a third portion 1006 of the timing diagram 1000 can represent CQI reporting by way of an Uplink High Speed Dedicated Physical Control Channel (UL HS-DPCCH). $S_1$ 1008 and $D_1$ 1010 indicate blocks of scheduling information and user data, respectively, related to a shown CQI report. Accordingly, $S_0$ 1012 and $D_0$ 1014 are the previous scheduling and data blocks (e.g., the last blocks that are unaffected by a CQI report 1016). $T_0$ can mark the end of the CQI report 1016, at which time user equipment that generated the CQI report 1016 has determined that it desires a measurement gap but should wait to allow buffered downlink data to flush, e.g., be transmitted to the UE.

If it is assumed that the CQI report 1016 is received successfully and that the measurements are taken (either unilaterally or with permission within a scheduling block from a servicing network), then data in $D_1$ 1010 (and data thereafter for the duration of the measurement gap) is not directed to the subject user equipment. Accordingly, it is desirable to determine when the user equipment need not listen on the downlink channel. Since scheduling block $S_0$ 1012 was formulated without reference to the CQI report 1016 that included a request for a measurement gap, the user equipment should wait long enough to demodulate such information (e.g., until time $T_1$). If $S_0$ 1012 indicates that there is data scheduled for the user equipment, then the user equipment should listen through the corresponding data block $D_0$ 1014 (e.g., until time $T_2$). Additionally, if the user equipment relies upon the network to give explicit permission to perform measurements in the scheduling block $S_1$ 1008, then the user equipment should listen through the end of scheduling block $S_1$ 1008 until time $T_3$. The flushing delays in this example can range from 5.5 slots ($T_1$-$T_0$) to 8.5 slots ($T_3$-$T_0$).

Figure 11:
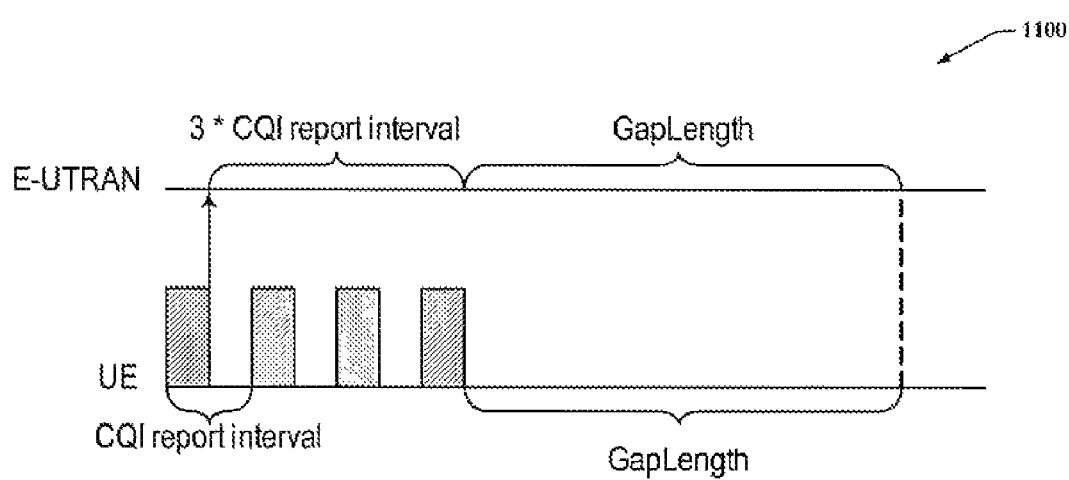
FIG. 11 is an example timing diagram.

Now turning to FIG. 11, an example graph 1100 depicting provision of a measurement gap is illustrated. If user equipment generates a request for a measurement gap (e.g., sends a CQI report with an indication that a measurement gap is required to a base station) and a network (e.g., an E-UTRAN) does not receive the indication, downlink data may be scheduled for the user equipment during a presumed gap. To minimize such risk, the user equipment might transmit several consecutive requests for a measurement gap to increase the likelihood that a servicing network will receive at least one of the requests. The network, however, should interpret the multiple requests as a single request (rather than granting multiple consecutive measurement gaps). This can be achieved by having the network automatically interpret consecutive gap requests as copies of one another, by establishing a "gap prohibit" time in the network, or any other suitable manner.

If a gap prohibit timer is utilized, the timer is started when the first gap request from the user equipment is received, and, until the timer expires, no further occasions will be granted to the same user equipment. The timer can be designed to utilize a time that is long enough in duration to cover repetitions sent by the user equipment but short enough in duration to prevent "starving" user equipment that may actually need several measurement occasions over a relatively brief period of time. If the timer is set such that the time is substantially similar to the gap length, the timer dictates that the network should not grant a gap request on a request received during a scheduled gap.

If multiple gap requests are transmitted from the user equipment to a base station, then a guard time can be added to length of the gap. For instance, the network can assume that a gap request received by the network was the first repetition and that the user equipment transmitted a complete set of repetitions prior to initiating its actual measurement gap. Thus, if each gap request is repeated n times, the gap length can be extended by n−1 times the interval between consecutive gap requests beyond what is actually needed for the user equipment to perform measurements. FIG. 11 illustrates this situation (for n=4). If the network missed the first gap request and therefore initiated a portion of the process later than expected, the effect is only that the gap is slightly longer than necessary.

In an alternative example, if user equipment has an uplink data service (such as advanced uplink (EUL)), and the uplink and downlink serving cells belong to a substantially similar Node B, the user equipment can transmit a gap requesting using layer 2 signaling on the uplink (e.g., a MAC-E header) rather than using layer 3 signaling (such as a CQI report). Where explicit permission from the network is desired before the user equipment begins taking measurements, the permission can be delivered in the corresponding layer 2 acknowledgment. The layer 2 acknowledgment allows the user equipment to know when its gap request has been received by the network. If layer 2 signaling is utilized, then delay for flushing of a downlink buffer can be extended accordingly. In yet another example, reliability of a gap request transmission can be improved by increasing power for the gap request on the uplink.

Figure 12:
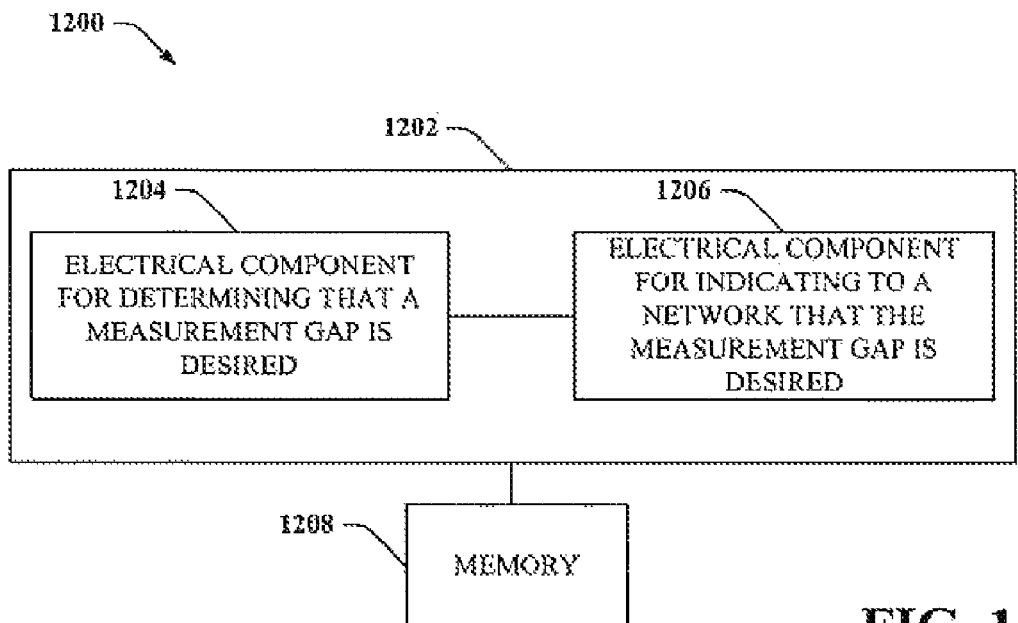
FIG. 12 is an example system that facilitates indicating to a wireless network that a measurement gap is desired.

Now referring to FIG. 12, a system 1200 that can be utilized in connection with indicating that a measurement gap is desired is illustrated. For example, the system 1200 can reside at least partially within user equipment. It is to be appreciated that system 1200 is represented as including functional blocks, wherein such blocks can represent functions implemented by a processor, software, or combination thereof (e.g., firmware). System 1200 includes a logical grouping 1202 of electrical components that can act in conjunction to indicate that a measurement gap is desired. For instance, the grouping 1202 can include an electrical component 1204 for determining that a measurement gap is desired, in other words, a component within user equipment can determine that the user equipment should perform measurements with respect to a different technology and/or a different frequency than what is associated with a network that is currently servicing the user equipment.

Grouping 1202 can additionally include an electrical component 1206 for indicating to the network servicing the user equipment that the measurement gap is desired. For example, the component 1206 can be associated with instructions for transmitting the indication to a base station associated with the servicing network. Additionally, system 1200 can include a memory 1208 that retains instructions for executing functions associated with the electrical components 1204 and 1206. While shown as being external to memory 1208, it is to be understood that the electrical components 1204 and 1206 can exist within memory 1208.

Figure 13:
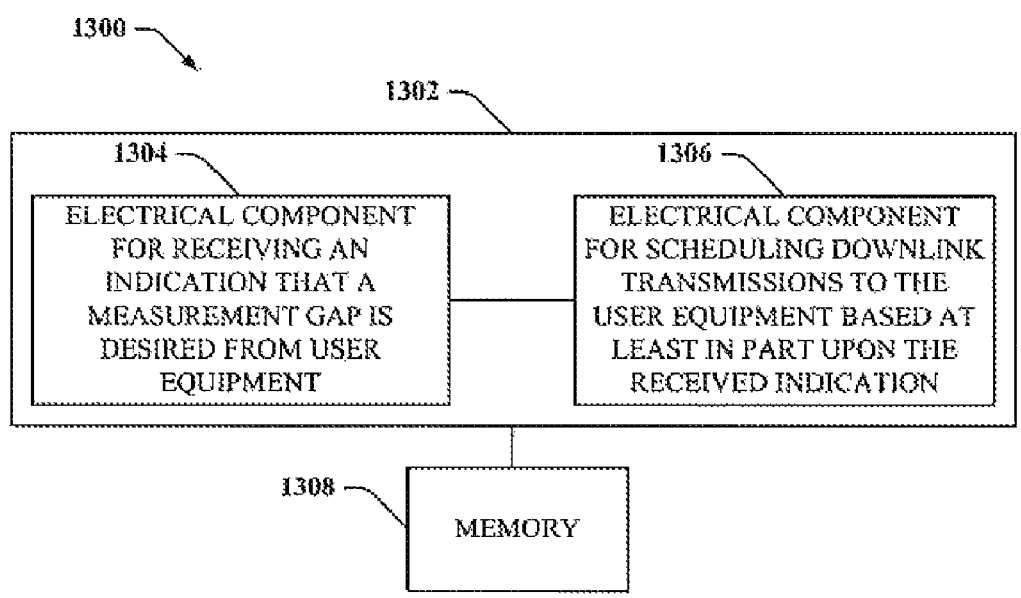

Turning now to FIG. 13, a system 1300 that facilitates scheduling data to be delivered on a downlink to user equipment upon receipt of a request for a measurement gap is illustrated. System 1300 can reside within a network-side device, such as within a base station. System 1300 includes a logical grouping 1302 of electrical components that facilitate scheduling data. Grouping 1302 includes an electrical component 1304 for receiving an indication that a measurement gap is desired from user equipment. In an example, the indication can be within a CQI report, within a MAC-e header, etc. Grouping 1302 additionally includes an electrical component 1306 for scheduling downlink transmissions to the user equipment based at least in part upon the received notification. For instance, a measurement gap can be scheduled such that data is not transmitted over the downlink to the user equipment for a particular period of time (thereby allowing the user equipment to perform measurements with respect to different frequencies and/or technologies). Additionally, system 1300 can include a memory 1308 that retains instructions for executing functions associated with the electrical components 1304 and 1306. While shown as being external to memory 1308, it is to be understood that the electrical components 1304 and 1306 can exist within memory 1308.

Figure 14:
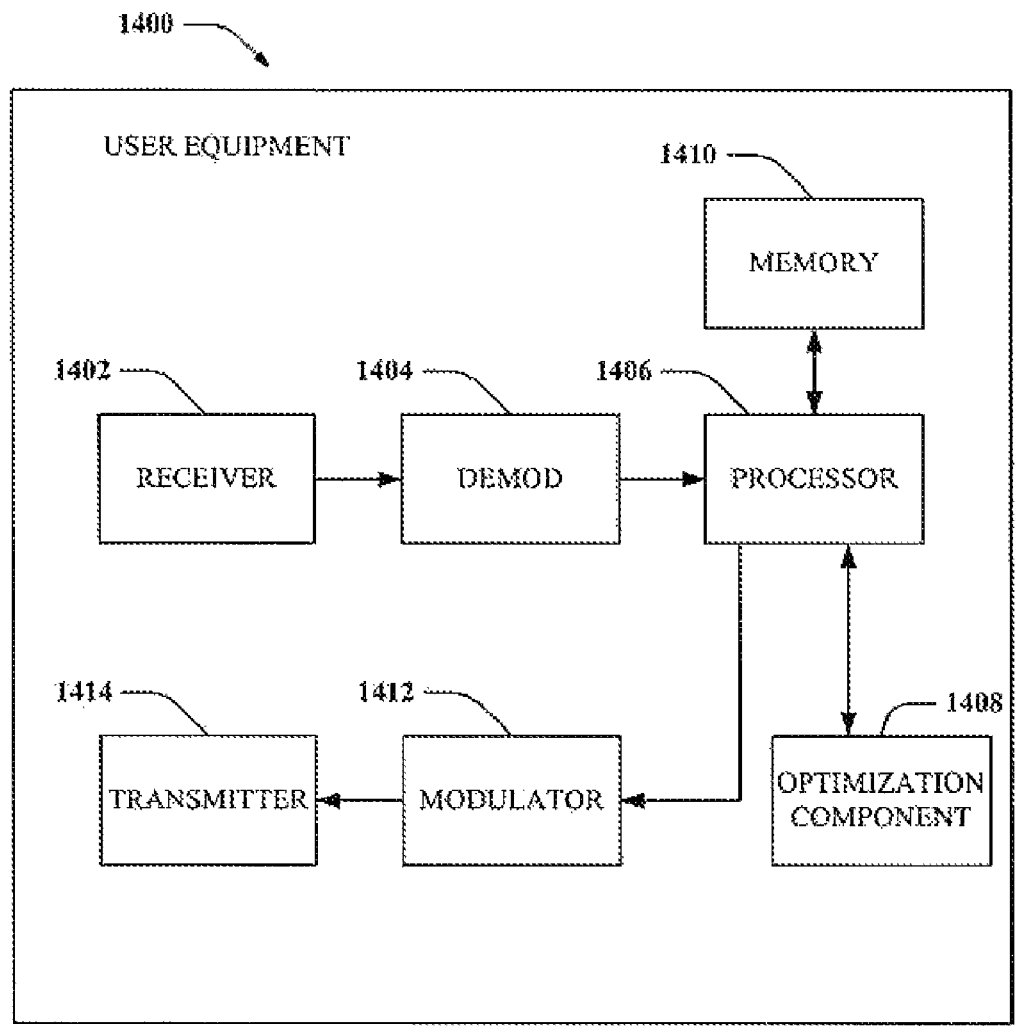
FIG. 14 is an illustration of an example system that can be utilized in connection with requesting a measurement gap.

FIG. 14 illustrates a system 1400 that can be utilized in connection with requesting a measurement gap. System 1400 comprises a receiver 1402 that receives a signal from, for instance, one or more receive antennas, and performs typical actions thereon (e.g., filters, amplifies, downconverts, . . . ) the received signal and digitizes the conditioned signal to obtain samples. A demodulator 1404 can demodulate and provide received pilot symbols to a processor 1406 for channel estimation.

Processor 1406 can be a processor dedicated to analyzing information received by receiver component 1402 and/or generating information for transmission by a transmitter 1414. Processor 1406 can be a processor that controls one or more portions of system 1400, and/or a processor that analyzes information received by receiver 1402, generates information for transmission by a transmitter 1414, and controls one or more portions of system 1400. System 1400 can include an optimization component 1408 that can optimize performance of user equipment before, during, and/or after performance of measurements with respect to one or more technologies and/or frequencies. Optimization component 1408 may be incorporated into the processor 1406. It is to be appreciated that optimization component 1408 can include optimization code that performs utility based analysis in connection with requesting measurement gaps. The optimization code can utilize artificial intelligence based methods in connection with performing inference and/or probabilistic determinations and/or statistical-based determination in connection with requesting measurement gaps and/or performing measurements.

System (user equipment) 1400 can additionally comprise memory 1410 that is operatively coupled to processor 1406 and that stores information such as measurement gap information, scheduling information, and the like, wherein such information can be employed in connection with allocating requesting measurement gaps and performing measurements during a measurement gap. Memory 1410 can additionally store protocols associated with generating lookup tables, etc., such that system 1400 can employ stored protocols and/or algorithms to increase system capacity. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1410 is intended to comprise, without being limited to, these and any other suitable types of memory. Processor 1406 is connected to a symbol modulator 1412 and transmitter 1414 that transmits the modulated signal.

Figure 15:
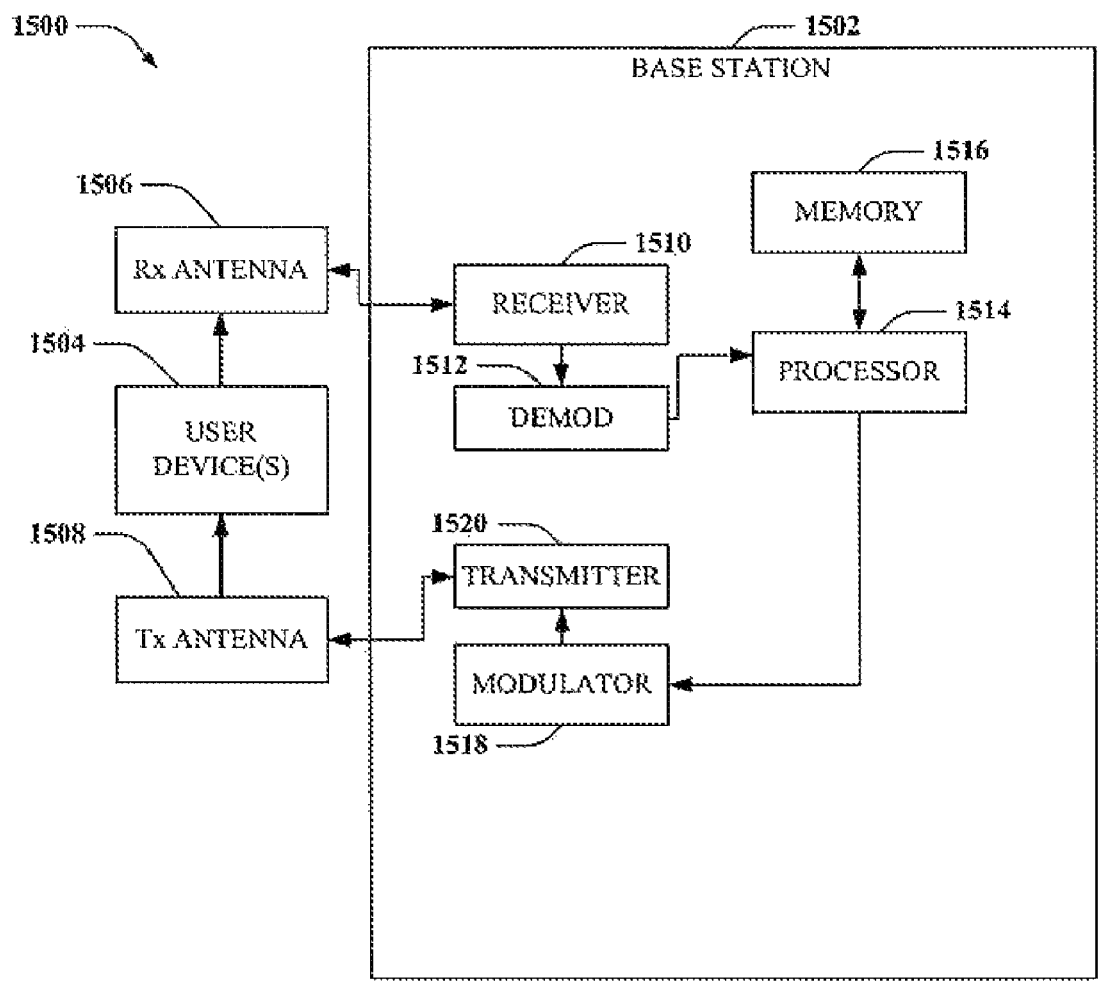
FIG. 15 is an illustration of an example system that can be utilized in connection with scheduling a measurement gap.

FIG. 15 illustrates a system that may be utilized in connection with receiving a measurement gap request and scheduling a measurement gap with respect to user equipment. System 1500 comprises a base station 1502 with a receiver 1510 that receives signal(s) from one or more user devices 1504 by way of one or more receive antennas 1506, and transmits to the one or more user devices 1504 through a plurality of transmit antennas 1508. In one example, receive antennas 1506 and transmit antennas 1508 can be implemented using a single set of antennas. Receiver 1510 can receive information from receive antennas 1506 and is operatively associated with a demodulator 1512 that demodulates received information. Receiver 1510 can be, for example, a Rake receiver (e.g., a technique that individually processes multi-path signal components using a plurality of baseband correlators, . . . ), an MMSE-based receiver, or some other suitable receiver for separating out user devices assigned thereto, as will be appreciated by one skilled in the art. For instance, multiple receivers can be employed (e.g., one per receive antenna), and such receivers can communicate with each other to provide improved estimates of user data. Demodulated symbols are analyzed by a processor 1514 that is similar to the processor described above with regard to FIG. 14, and is coupled to a memory 1516 that stores information related to user device assignments, lookup tables related thereto and the like. Receiver output for each antenna can be jointly processed by receiver 1510 and/or processor 1514. A modulator 1518 can multiplex the signal for transmission by a transmitter 1520 through transmit antennas 1508 to user devices 1504.

It is to be understood that the embodiments described herein may be implemented by hardware, software, firmware, middleware, microcode, or any combination thereof. For a hardware implementation, the processing units within an user equipment or a network device may be implemented within one or more application specific integrated circuits (ASICS), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the systems and/or methods described herein are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. A memory unit may be implemented within the processor or external to the processor, in which case it can be communicatively coupled to the processor through various means.

What has been described above includes examples of the disclosed subject matter. It is, of course, not possible to describe every conceivable combination of components or methodologies for purposes of describing such subject matter, but one of ordinary skill in the art may recognize that many further combinations and permutations are possible. Accordingly, the subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is;

1. A method for determining signal quality in a communication network, comprising:
    measuring, on a wireless communication device, a signal quality on a first network downlink channel;
    comparing the signal quality of the first network downlink channel with a threshold quality value;
    determining, based upon the comparing, whether to tune to a second network channel to obtain signal characteristics of the second network channel, wherein the second network channel corresponds to at least one of a different frequency and a different radio-access technology than the first network downlink channel;
    requesting a measurement gap from a network base station, wherein the network base station is in communication with the wireless communication device via the first network downlink channel;
    measuring a signal quality of the second network channel during the measurement gap; and
    determining whether to switch communications to the communication network via the second network channel.

2. The method of claim 1, wherein requesting a measurement gap comprises transmitting a channel quality indicator (CQI) report.

3. The method of claim 1, further comprising relaying multiple indications of a desirability of undertaking the measurements to the network.

4. The method of claim 1, further comprising transmitting the request for the measurement gap to the communication network by way of layer 3 signaling.

5. The method of claim 1, further comprising transmitting the request for the measurement gap to the communication network by way of layer 2 signaling.

6. The method of claim 1, further comprising performing the measurements upon requesting the measurement gap without awaiting receipt of an acknowledgment from the communication network.

7. The method of claim 1, further comprising:
    receiving an acknowledgment that the communication network has received the request for the measurement gap; and
    performing the measurements upon receipt of the acknowledgment.

8. The method of claim 1, further comprising indicating to the communication network that the user equipment has performed the measurements and is ready for additional data communication.

9. The method of claim 1, further comprising
    receiving a schedule from the network base station, the schedule indicating a duration of time within which the second channel signal quality measurements can be undertaken; and
    performing the measurements in accordance with the schedule.

10. The method of claim 1, wherein requesting the measurement gap comprises transmitting an indication within a MAC-e header.

11. The method of claim 1, further comprising:
    determining that it is desirable to undertake the measurements based at least in part upon the determination that the signal quality of the downlink channel is below the threshold.

12. User equipment configured to perform the method of claim 1.

13. The method of claim 1, wherein the threshold quality value relates to signal quality of a downlink channel.

14. A communications apparatus, comprising:
    a memory that comprises instructions for indicating to a network that performing measurements on a second network channel is desired, wherein the second network channel corresponds to at least one of a different frequency and a different radio-access technology than a first network downlink channel;
    a processor that is configured to execute the instructions within the memory;
    a quality metric component that measures a signal quality of the first network downlink channel, compares the signal quality metric with a threshold signal quality metric value, and in the event that the signal quality metric is below the threshold, generates a request for a measurement gap, where the measurement gap has a duration of at least one or more frame time-slots, and measures a signal quality of the second network channel during the measurement gap; and
    a transceiver component to forward the measurement gap request to a network base station, wherein the network base station is in communication with the wireless communication device via the first network downlink channel.

15. The communications apparatus of claim 14, the memory further comprises instructions for comparing the determined quality metric with a pre-defined threshold defined by a network that is providing services to the communications apparatus.

16. The communications apparatus of claim 14, the memory further comprises instructions for performing the measurements without transmittal of the request to the network.

17. The communications apparatus of claim 14, the memory further comprises instructions for packaging the request within a channel quality indicator report.

18. The communications apparatus of claim 14, the memory further comprises instructions for packaging the request within a MAC-e header.

19. The communications apparatus of claim 14 being a mobile telephone.

20. The communications apparatus of claim 14, the memory further comprises instructions for indicating to a network that measurements have been performed and that the communications apparatus is ready for additional data communication.

21. A communications apparatus, comprising:
- means for measuring a signal quality of a first network downlink channel;
- means for determining that the measured signal quality is below a threshold value;
- means for determining that a measurement gap is desired, wherein a duration of the measurement gap comprises one or more frame time-slots;
- means for indicating to a network base station that the measurement gap is desired, wherein the network base station is in communication with the wireless communication device via the first network downlink channel; and
- means for measuring a signal quality of a second network channel during the measurement gap, wherein the second network channel corresponds to at least one of a different frequency and a different radio-access technology than the first network downlink channel.

22. A computer readable non-transitory storage medium, having stored thereon, computer executable instructions for determining signal quality in a communication network according to a method comprising:
- measuring, on a wireless communication device, a signal quality on a first network downlink channel;
- comparing the signal quality of the first network downlink channel with a threshold quality value;
- determining, based upon the quality comparison, whether to tune to a second network channel to obtain signal characteristics of that channel, wherein the second network channel corresponds to at least one of a different frequency and a different radio-access technology than the first network downlink channel;
- requesting a measurement gap from a network base station, wherein the network base station is in communication with the wireless communication device via the first network downlink channel;
- measuring a signal quality of the second network channel during the measurement gap; and
- determining whether to switch communications to the network via the second network channel.

\* \* \* \* \*